(12) United States Patent
Alexander

(10) Patent No.: US 10,142,145 B2
(45) Date of Patent: Nov. 27, 2018

(54) WIRELESS RECEIVER

(71) Applicant: Cohda Wireless Pty Ltd., North Adelaide (AU)

(72) Inventor: Paul Dean Alexander, North Adelaide (AU)

(73) Assignee: Cohda Wireless Pty Ltd., North Adelaide (AU)

( * ) Notice: Subject to any disclaimer, the term of this patent is extended or adjusted under 35 U.S.C. 154(b) by 0 days.

(21) Appl. No.: 15/362,426

(22) Filed: Nov. 28, 2016

(65) Prior Publication Data
US 2017/0155532 A1 Jun. 1, 2017

(30) Foreign Application Priority Data

Nov. 27, 2015 (AU) .................................. 2015904911

(51) Int. Cl.
| | |
|---|---|
| H04L 27/233 | (2006.01) |
| H04L 25/02 | (2006.01) |
| H04L 25/03 | (2006.01) |
| H04L 25/06 | (2006.01) |

(52) U.S. Cl.
CPC ...... H04L 27/2338 (2013.01); H04L 25/0258 (2013.01); H04L 25/03006 (2013.01); H04L 25/067 (2013.01); *H04L 25/0212* (2013.01); *H04L 2025/03624* (2013.01)

(58) Field of Classification Search
CPC ............. H04L 27/2338; H04L 25/0258; H04L 25/03006; H04L 2025/03624
See application file for complete search history.

(56) References Cited

U.S. PATENT DOCUMENTS

| | | | |
|---|---|---|---|
| 6,185,258 B1* | 2/2001 | Alamouti | H04B 7/0613 375/260 |
| 2002/0186778 A1* | 12/2002 | Agami | H04L 1/0041 375/261 |
| 2003/0138056 A1* | 7/2003 | Uesugi | H04L 1/005 375/262 |
| 2005/0018641 A1 | 1/2005 | Zhao et al. | |
| 2005/0054319 A1* | 3/2005 | Tamaki | H04L 27/3488 455/296 |
| 2005/0069023 A1 | 3/2005 | Bottomley et al. | |

(Continued)

OTHER PUBLICATIONS

"Australian Application No. 2015904911, Australian Search Report dated Oct. 21, 2016", (Oct. 21, 2016), 7 pgs.

*Primary Examiner* — Kenneth Lam
(74) *Attorney, Agent, or Firm* — Schwegman Lundberg & Woessner, P.A.

(57) ABSTRACT

The present invention relates to a method and apparatus for demodulation in a wireless communications system transmitted across a wireless communications channel. The described wireless receiver includes a first antenna for receiving a wireless signal including a symbol transmitted across a wireless communications channel perceived by the first antenna, an observation modifier for generating a modified observation (y) of the symbol based on a product of the received observation (r) and the complex conjugate of a channel estimate (h*), a log-likelihood ratio (LLR) module generating log-likelihood ratios (LLRs) based on the modified observation and the channel estimate, and a maximum-likelihood-based decoder for decoding the symbol based on the LLRs.

16 Claims, 16 Drawing Sheets

(56) References Cited

U.S. PATENT DOCUMENTS

| | | | |
|---|---|---|---|
| 2008/0291888 A1* | 11/2008 | Maret | H04L 5/0016 370/342 |
| 2009/0041165 A1* | 2/2009 | Higashinaka | H04B 1/71057 375/341 |
| 2010/0020896 A1 | 1/2010 | Willems et al. | |
| 2010/0027688 A1* | 2/2010 | Suh | H04B 7/0619 375/260 |
| 2010/0034323 A1* | 2/2010 | Stoye | H04L 1/0045 375/341 |
| 2010/0316151 A1* | 12/2010 | Fukawa | H04L 25/03171 375/260 |
| 2013/0051444 A1* | 2/2013 | Roh | H04L 25/067 375/222 |
| 2015/0139350 A1* | 5/2015 | Sugihara | H04L 27/3845 375/286 |
| 2015/0188667 A1 | 7/2015 | Tong et al. | |
| 2016/0013952 A1* | 1/2016 | Nakamura | H04L 27/2647 375/340 |

\* cited by examiner

WIRELESS RECEIVER

CLAIM OF PRIORITY

This application claims the benefit of priority of Australia Patent Application No. 2015904911, filed on Nov. 27, 2015, the benefit of priority of which is claimed hereby, and which is incorporated by reference herein in its entirety.

FIELD OF THE INVENTION

The present invention relates to a method and apparatus for demodulation in a wireless communications system. More particularly, the present invention relates to a method and apparatus for demodulating modified observations of a symbol transmitted across a wireless communications channel.

BACKGROUND OF THE INVENTION

Referring to FIG. 1A, in a wireless communications system, a transmitter 110 and a receiver 120 communicate via a wireless communications channel 150. The transmitter may include an encoder 112 which encodes input information bits into coded bits, and a modulator 118 which modulates the coded bits into a suitable signal format at radio-frequency (RF) frequencies for wireless transmission by the transmitting antenna through the communications channel 150.

In practice, the effects of the communication channel 150 are to distort the RF signal by, for example, introducing multipath effects, noise, timing jitters and frequency offsets. The role of the encoder 112 is to add redundancy to the transmitted data so that errors due to such signal distortions can be corrected after the distorted RF signal is received and demodulated at the receiver 120.

At the receiver 120, a receiving antenna receives the distorted RF signal. The receiver 120 includes a demodulator 122 to demodulate the received RF signal to generate received bits 124. The received bits 124 generally differ from the coded bits 116 due to the signal distortions. The receiver 120 also includes a decoder 126 to decode the received bits. The decoding process generates an estimate 128 of the information bits 114 by essentially reversing the operation of decoder and, in doing so, attempting to recover the information bits 114 in the presence of the signal distortions. The receiver 120 further includes a channel estimator 130 to counteract the effects of the channel 150. FIG. 1A illustrates that the decoder 126 in the illustrated example includes a Viterbi decoder preceded by a block for preparing inputs for the computation of branch metrics. The decoder 126 estimates the information bearing bits, which are re-encoded to allow use as training symbols in channel estimation. The accuracy of the estimated channel will determine the performance of the receiver 120. The transmitter/receiver may include other components which are omitted from FIG. 1A, such as an interleaver/de-interleaver, a scrambler/de-scrambler, and a puncturer/depuncturer.

In the case of an orthogonal frequency division multiplxing (OFDM) based system, the received jth subcarrier in the ith data bearing OFDM symbol of a packet is modelled as $$r[i,j] = h[i,j]d[i,j] + n[i,j] \qquad (1)$$

where h[i,j] is a complex number representing the frequency domain channel affecting subcarrier j in symbol i, d[i,j] is the symbol sent at the transmitter, and n[i,j] is additive white Gaussian noise (AWGN) affecting the subcarrier. That is, r represents an observation of a received symbol d which has been subject to rotation and scaling (via multiplication by complex-valued h) and additive noise n.

In one implementation, the demodulation includes channel equalisation where the received subcarrier r[i,j] has the channel effects counteracted (or zero-forced) via division as follows:

$$y_{equalised}[i,j] = r[i,j]/h[i,j] \qquad (2).$$

The equalised or zero-forced observation $y_{equalised}[i,j]$ is then provided to the decoder for decoding.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE INVENTION

According to a first aspect of the invention, there is provided a method comprising: receiving, at a first antenna, an observation of a symbol transmitted across a wireless communications channel perceived by the first antenna; generating a modified observation based on a product of the received observation and the complex conjugate of a channel estimate of the channel; and generating, based on the modified observation and the channel estimate, log-likelihood ratios (LLRs) for a maximum-likelihood-based decoder to decode.

Generating log-likelihood ratios may include generating a LLR associated with a most significant bit of the symbol. The log-likelihood ratio (LLR) associated with the most significant bit may be generated based on the ratio of the real part ($y_I$) or imaginary part ($y_Q$) of the modified observation to Gaussian-distributed noise power of the channel. The LLR associated with the most significant bit may be estimated to be $2\ y_I/\sigma^2$ or $2\ y_Q/\sigma^2$, where $\sigma^2$ represents the Gaussian-distributed noise power of the channel. Alternatively the LLR associated with the most significant bit may be estimated to be $4\ y_I/\sigma^2$ or $4\ y_Q/\sigma^2$. Still alternatively the LLR associated with the most significant bit may be estimated to be $4\ y_I/\sigma^2 - 4|h|^2/\sigma^2$ or $4\ y_Q/\sigma^2 - 4|h|^2/\sigma^2$, where |h| represents the magnitude of the channel estimate. Still alternatively the LLR associated with the most significant bit may be $4\ y_I/\sigma^2 + 4|h|^2/\sigma^2$.

Generating log-likelihood ratios may include generating a LLR associated a next most significant bit of the symbol. The LLR associated with the next most significant bit may be generated based on the ratio of the real part ($y_I$) or imaginary part ($y_Q$) of the modified observation to Gaussian-distributed noise power of the channel. The LLR associated with the most significant bit is $4|h|/\sigma^2 - 2\ y_I/\sigma^2$ or $4|h|/\sigma^2 - 2\ y_Q/\sigma^2$.

The Gaussian-distributed noise power may be estimated or measured.

The method may further comprise receiving, at a second antenna located separately from the first antenna, another observation of the symbol transmitted across a wireless communications channel perceived by the second antenna, and wherein generating a modified observation includes generating the modified observation also based on a product of the other received observation and the complex conjugate of a channel estimate of the channel perceived by the second antenna. Generating the modified observation may be based on a weighted sum of (a) the product of the received observation and the complex conjugate of a channel estimate of the channel and (b) the product of the other received observation and the complex conjugate of a channel estimate of the channel perceived by the second antenna. The weighted sum may be based on weights associated with the noise power as observed by the respective antennas.

The method may further comprise decoding, by a maximum-likelihood-based decoder, the LLRs.

According to a second aspect of the invention, there is provided a wireless receiver comprising: a first antenna for receiving an observation including a symbol transmitted across a wireless communications channel perceived by the first antenna; an observation modifier for generating a modified observation based on a product of the received observation and the complex conjugate of a channel estimate of the channel; a log-likelihood ratio (LLR) module generating log-likelihood ratios (LLRs) based on the modified observation; and a maximum-likelihood-based decoder for decoding the symbol based on the LLRs.

The wireless receiver may further comprise a second antenna for receiving another observation of the symbol transmitted across a wireless communications channel by the second antenna, the first antenna and the second antenna are located to provide spatial diversity, wherein the observation modifier is configured to generate the modified observation based on weighted sum of (a) the product of the received observation and the complex conjugate of a channel estimate of the channel and (b) the product of the other received observation and the complex conjugate of a channel estimate of the channel perceived by the second antenna.

The weighted sum may be based on weights associated with the noise power as observed by the respective antennas.

The wireless receiver may further comprise a maximum-likelihood-based decoder for decoding the LLR.

According to a third aspect of the invention, there is provided a non-transitory machine-readable medium comprising instructions executable by one or more processors, the instructions including the steps according to the method of the first aspect.

Further aspects of the present invention and further embodiments of the aspects described in the preceding paragraphs will become apparent from the following description, given by way of example and with reference to the accompanying drawings.

DETAILED DESCRIPTION OF EMBODIMENTS

Equalisation in Varying Channels

The inventors have recognised that the equalisation characterised by Equation (2) may give rise to degradation in decoding performance if the channel is time-varying due to, for example, changing multipath effects arising from movements of the receiver, the transmitter and/or any surrounding objects.

Referring to Equation (1), the symbol d may be formed at the transmitter based on a sequence of coded bits. For example, 1, 2, 4 or 6 coded bits may map to binary phase-shift keying (BPSK), quadrature phase-shift keying (QPSK), 16-QAM (quadrature amplitude modulation) or 64-QAM constellations, respectively. Noise n is characterised by its power, and may be estimated or measured at the receiver. For receivers implementing maximum-likelihood based decoding, such as Viterbi decoding, the inventors recognise that degradation in decoding performance can arise if the noise statistics of the inputs to the Viterbi decoder are not constant over the received coded bits. The degradation can be attributed to the reliance of maximum-likelihood based estimation of the bit sequence on the product of Gaussian-distributed noise statistics. An illustrative example using BPSK is described as follows.

In the case of BPSK, the Gaussian-distributed probability of the additive white Gaussian noise (AWGN) for each of the two possible symbols for a respective subcarrier j can be characterised by:

$$C \exp\left[\frac{|r_i - h_i d_i|^2}{2\sigma^2}\right] \quad (3)$$

over all bits constituting the bit sequence, where i now indexes the bit position in the sequence, C is a constant, $\sigma^2$ represents the noise power and $|r_i - h_i d_i|$ represents the noise-induced deviation in the I-Q (in-phase and quadrature) plane between the received bit ($r_i$) and the transmitted bit affected by a noise-free channel ($h_i d_i$). For higher order constellations, a similar sequence metric can be formed.

In practice, Viterbi decoding is executed in the logarithmic domain. Instead of computing a product of exponentials, therefore, a sum of exponents is computed to provide the Viterbi metric in the following form:

$$\sum_i \left[ \frac{|r_i - h_i d_i|^2}{2\sigma^2} \right] \tag{4}$$

where, for the purposes of calculating the metric, C is ignore since it is a constant for all sequence $\{d_i\}$ considered. Viterbi decoding involves, among other steps, considering all possible bit sequences and selecting the one with the highest likelihood (or least distance in the logarithmic domain). If $\sigma$ is constant, it too can be disregarded as it will not affect the selection based on sequence metrics. In practice, the Viterbi decoding may therefore be reduced to accumulators of the inputs, such that they can be run faster to inspect the possible bit sequences, albeit in a highly structured manner.

If a received observation is equalised, the equalised observation y according to Equation (2) is given by $$y_{equalised} = r/h = d + n/h \tag{5}$$

Figure 1:
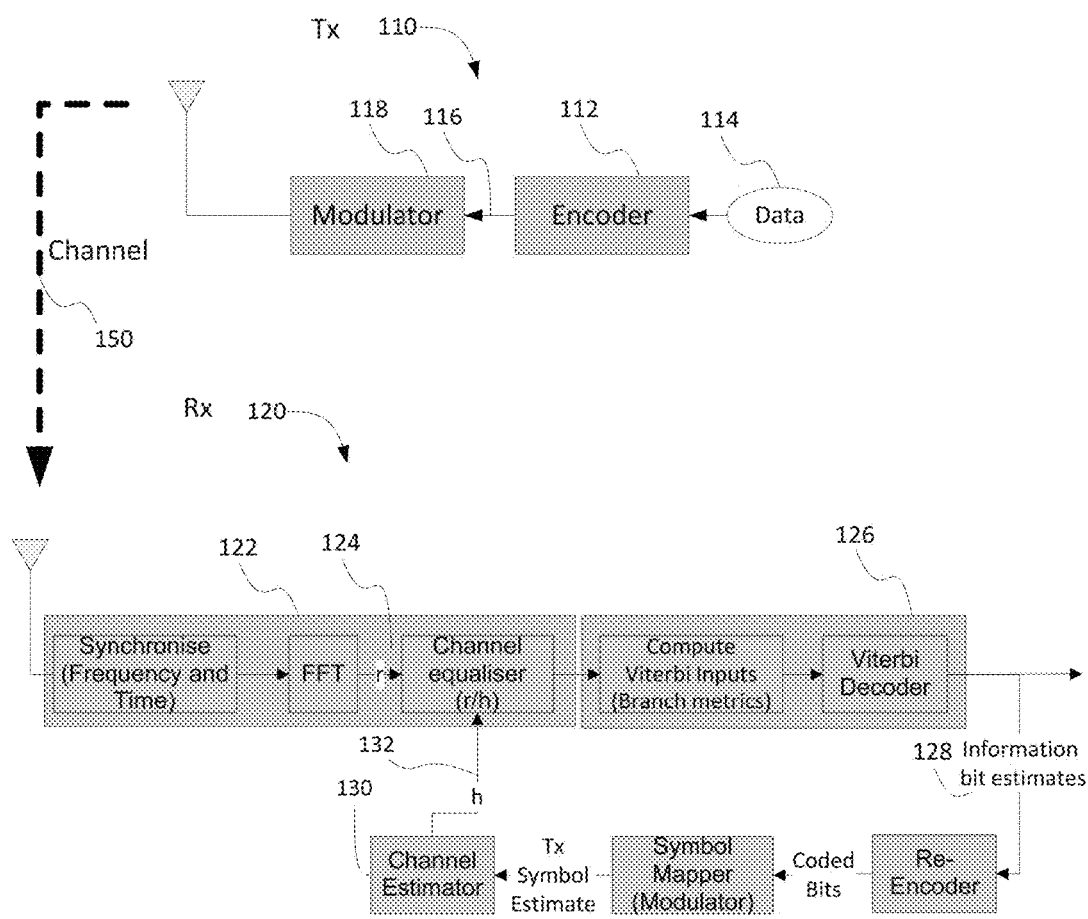
FIG. 1 illustrates a schematic diagram of a wireless communications system including a transmitter and a receiver.
Figure 2A:
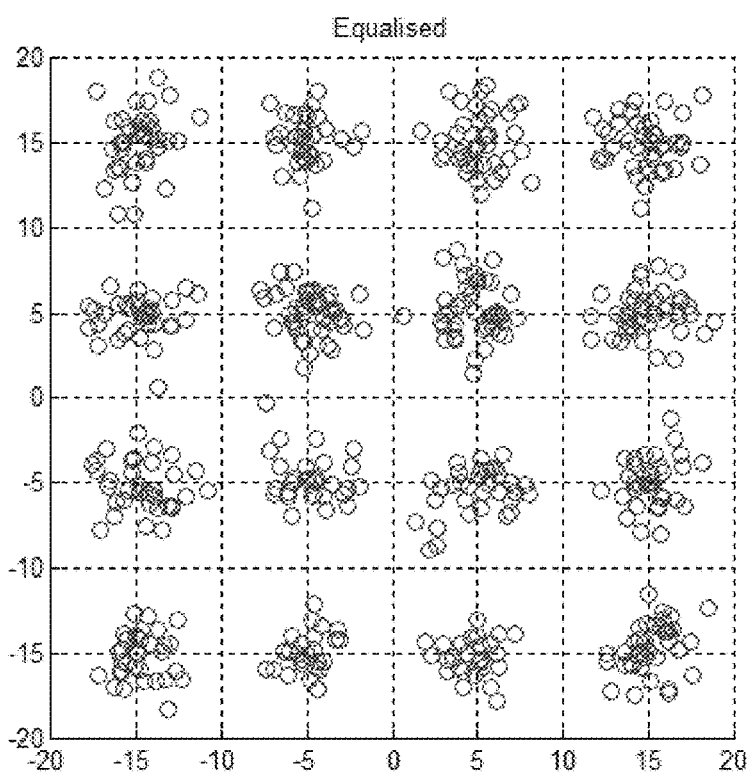
FIGS. 2A and 2B illustrate simulated 16-QAM constellation diagrams of (A) equalised received symbols and (B) LLR-processed (log-likelihood-ratio-processed) received symbols under high channel-power-to-noise-power, or signal-to-noise, ratio (SNR).
Figure 2B:
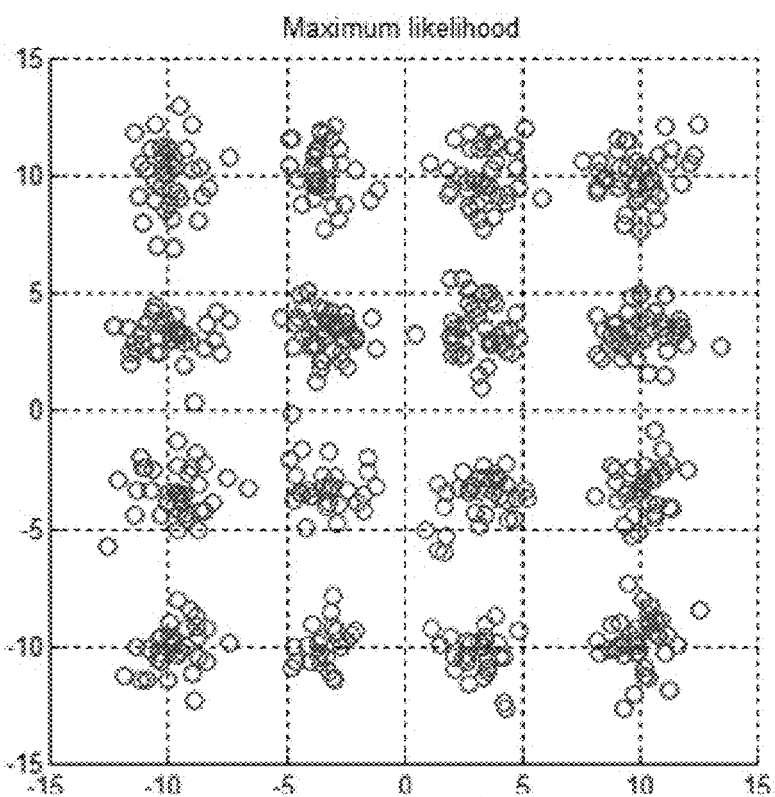
Figure 3A:
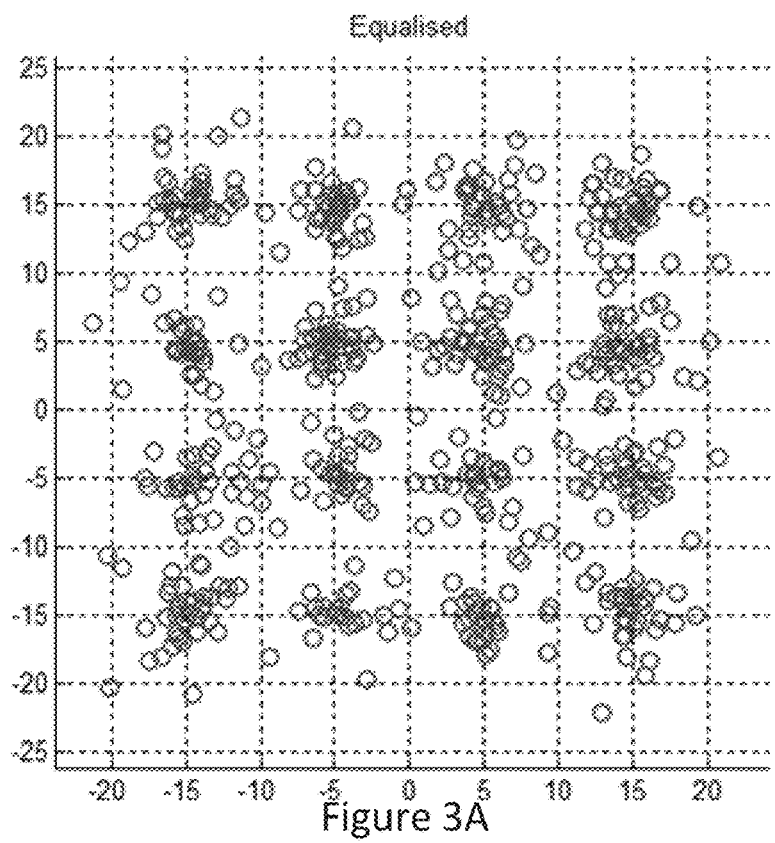
FIGS. 3A and 3B illustrate simulated 16-QAM constellation diagrams of (A) equalised received symbols and (B) LLR-processed received symbols under medium channel-power-to-noise-power, or signal-to-noise, ratio (SNR).
Figure 3B:
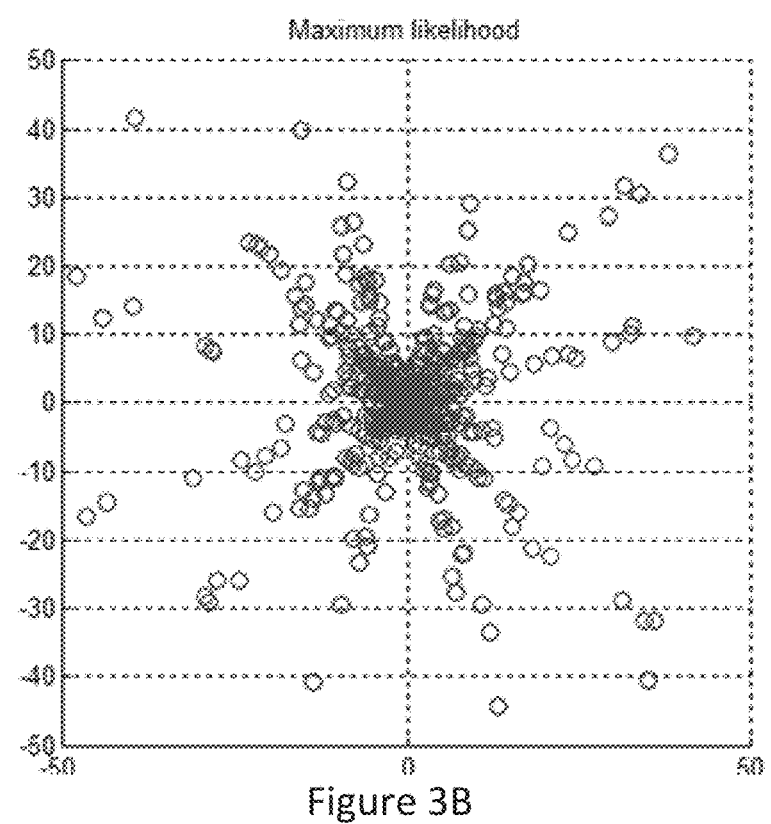
Figure 4A:
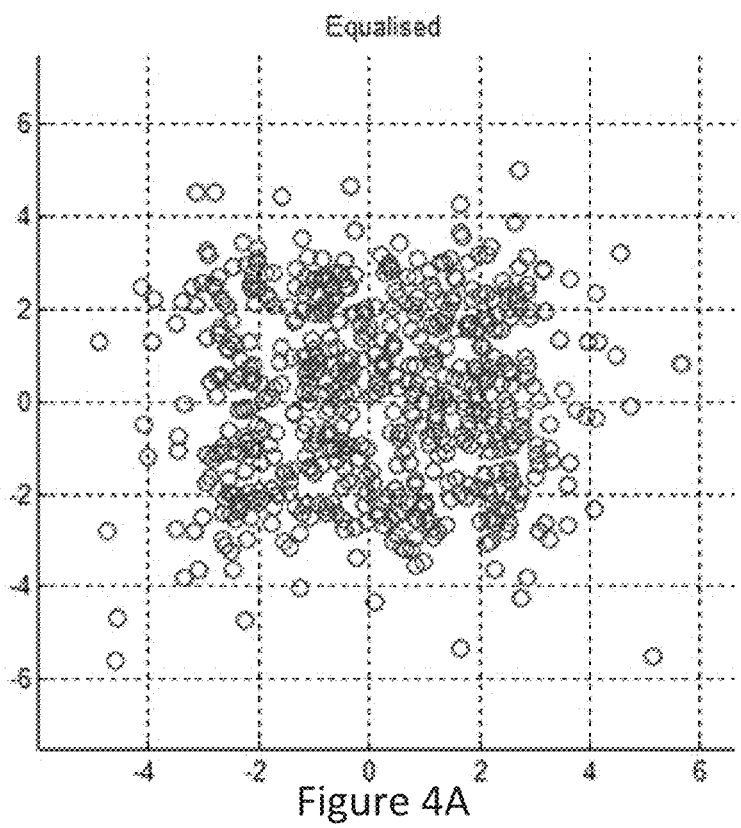
FIGS. 4A and 4B illustrate simulated 16-QAM constellation diagrams of (A) equalised received symbols and (B) LLR-processed received symbols under low channel-power-to-noise-power, or signal-to-noise, ratio (SNR).
Figure 4B:
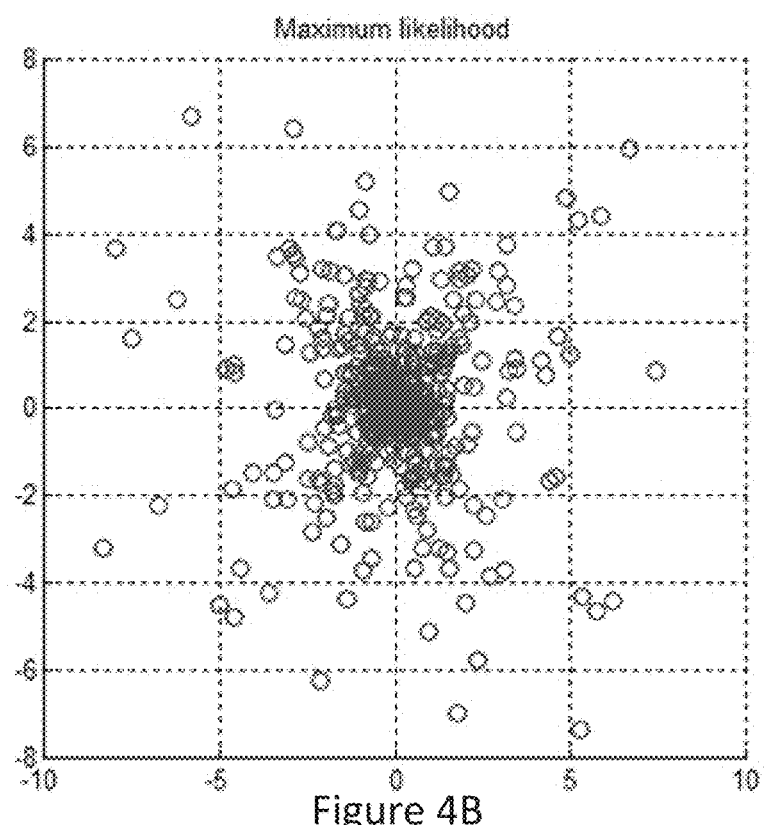

In the case where the channel h is varying in amplitude (e.g. in the case of fading channels), the effective noise power presented at the input of the Viterbi decoder (i.e. $\sigma^2$ scaled based on h) is no longer identically distributed from bit to bit and the Viterbi metric cannot be simplified as above without loss of performance. To illustrate such a loss in performance, FIGS. 2A-4B illustrate simulated 16-QAM constellation diagrams of (a) received symbols equalised according to Equation (2) (labelled "Equalised") and (b) received symbols processed as log-likelihood ratios (LLR) in preparation for maximum-likelihood based decoding (labelled "Maximum-likelihood" and using a small-amplitude LLR approximation for the most significant bits described later) under high, medium, and low channel-power-to-noise-power, or signal-to-noise, ratio (SNR) at the receiver. Each dot plotted in the I-Q plane represents one of multiple received symbols constructed from a random sequence of input bits transmitted over a fading channel. The scattered pattern at each of the 16 constellation points (see, for example, FIG. 2A) arises from the AWGN. The vertical and horizontal scales of these plots are arbitrary. The received symbols are assumed to be transmitted via a fading channel. As illustrated in FIGS. 2A and 2B, under high SNR (around 20 dB), both (a) and (b) have a recognisable 16-QAM constellation structure. Under medium SNR (around 10 dB), only (a) has a recognisable 16-QAM constellation structure, as seen in FIGS. 3A and 3B. Under low SNR (around 5 dB), neither (a) nor (b) has a recognisable 16-QAM constellation structure, as seen in FIGS. 4A and 4B.

Having recognised the effects of varying effective noise from bit to bit on maximum-likelihood based decoding performance, the inventors have devised a method of demodulation based on a channel-matched observation to address these effects. The present disclosure is generally applicable to any QAM schemes, although each QAM scheme may be more efficiently implementation due to specific bit-to-constellation mapping. The following description discloses bit-to-constellation mapping using 16-QAM as an example. Similar bit-to-constellation mapping may be derived for higher-order QAM schemes.

Bit to Constellation Mapping

Figure 5:
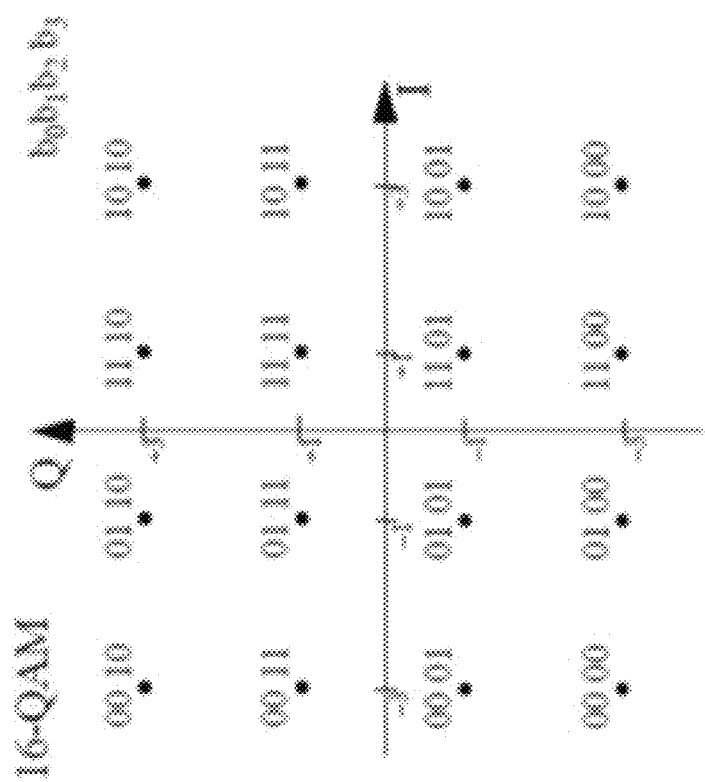
FIG. 5 illustrates bit to constellation mapping of 16-QAM system.

In 16-QAM, constellation symbols d are defined by four bits in the ordered sequence of b0, b1, b2 and b3, each representing a logical value of either 0 or 1, as shown in FIG. 5, and taking a real value of either −1 or 1, respectively, as used in Equations (6a)-(8b) below.

The real part $d_I$ (or the I-component) and the imaginary part $d_Q$ (or Q-component) of the symbol d may be given by:

$$d_I = 2b0 - b0b1 = b0(2 - b1) \tag{6a}$$

$$d_Q = 2b2 - b2b3 = b2(2 - b3) \tag{6b}$$

The absolute values of each component are given by:

$$|d_I| = |b0(2-b1)| = |2-b1| = 2-b1 \tag{7a}$$

$$|d_Q| = |b2(2-b3)| = |2-b3| = 2-b3 \tag{7b}$$

Re-arranging (7a) and (7b) provides:

$$b1 = 2 - |d_I| \tag{8a}$$

$$b3 = 2 - |d_Q| \tag{8b}$$

Equations (8a) and (8b) therefore illustrate that it is possible to recover the least significant bits b1 and b3 from the absolute value of the I and Q components.

In 16-QAM, b0 and b2 are referred to as the most significant bits, whereas b1 and b3 are referred to as the next (or the least) significant bits. In 64-QAM (where a symbol constitutes 6 bits in the ordered sequence of b0, b1, b2, b3, b4 and b5), b0 and b3 are the most significant bits, b1 and b4 are the next significant bits and b2 and b5 are the least significant bits.

A Wireless Receiver and a Demodulator

Figure 6A:
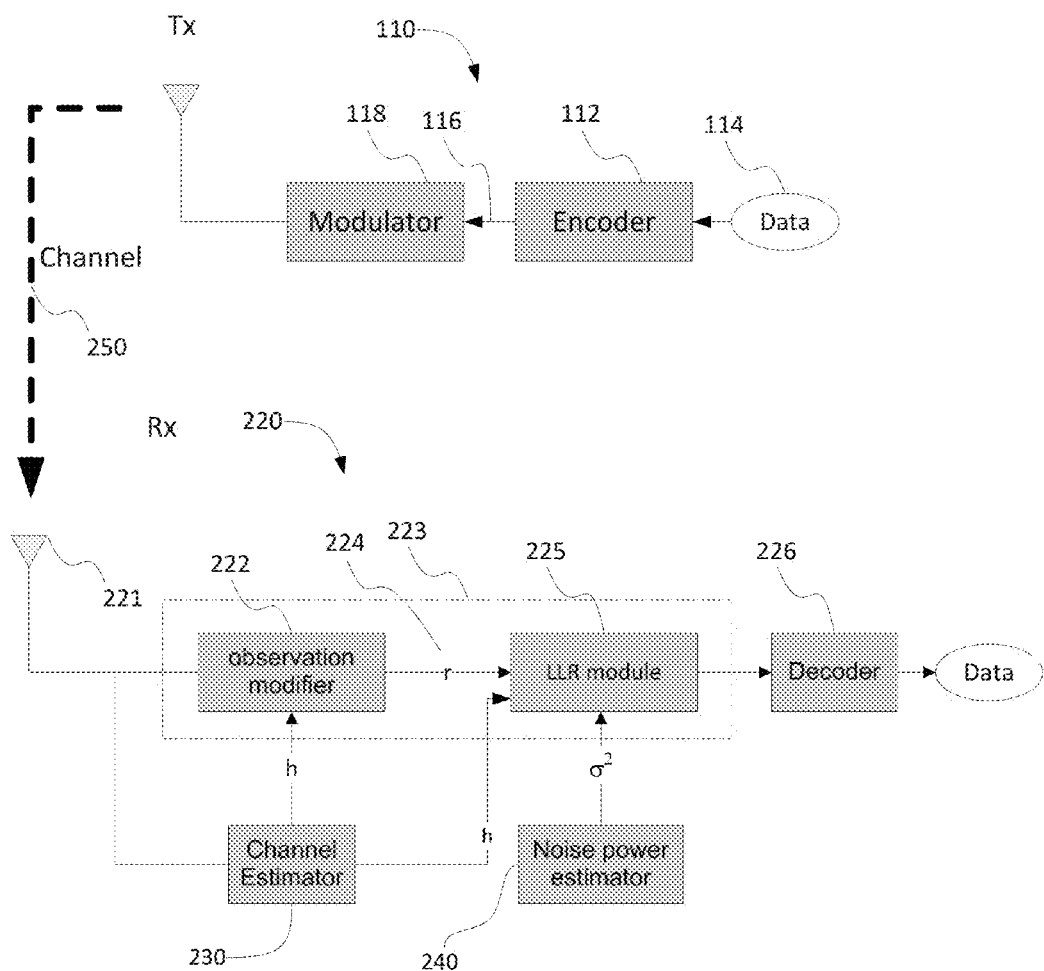
FIG. 6A illustrates a wireless transmitter and of a wireless receiver coupled by a communication channel in accordance with one embodiment.

Disclosed herein is a wireless receiver 220 as illustrated in FIG. 6A. The described wireless receiver 220 includes a first antenna 221 for receiving a wireless signal including a symbol transmitted across a wireless communications channel 250 perceived by the first antenna, an observation modifier 222 for generating a modified observation (v) of the symbol based on a product of the received observation (r) and the complex conjugate of a channel estimate (h*), a log-likelihood ratio (LLR) module 225 generating log-likelihood ratios (LLRs) based on the modified observation and the channel estimate, and a maximum-likelihood-based decoder 226 for decoding the symbol based on the LLRs. Together, the observation modifier 222 and the LLR module 225 may be referred to as a demodulator 223. The receiver 220 may be configured to perform a demodulation method 300 as illustrated in FIG. 6C. The outputs of the method 300 are log-likelihood ratios (LLRs) based on modified observations of a symbol for subsequent decoding by a maximum-likelihood-based decoder, such as 226. The described method 300 includes the step 302 of receiving, at a first antenna 221, an observation of a symbol transmitted across a wireless communications channel 250, the step 304 of generating a modified observation based on a product of the received observation (r) and the complex conjugate of a channel estimate (h*), and the step 306 of generating, based on the modified observation, log-likelihood ratios (LLRs) for a maximum-likelihood-based decoder, such as the decoder 226, to decode. Steps 304 and 306 may be carried out by the demodulator 223.

The wireless communications channel 250 is one that is perceived by the first antenna 221. In some arrangement, as illustrated in FIG. 6D, wireless receiver 220 includes a second antenna 221' located in relation to the first antenna 221 to provide spatial diversity. The second antenna 221' when so placed perceives a wireless communications channel 250' that is different from the channel 250 perceived by the first antenna and is associated with a different channel estimate 230'. In general, the first antenna 221 and the second antenna 221' are located at least approximately a wavelength of the wireless signal apart for spatial diversity.

In one arrangement, the wireless receiver 220 further includes, for each antenna, a channel estimator 230 for providing the channel estimate and a noise power estimator 240 for estimating or measuring the noise power of the perceived channel. As described further below, the observation modifier 222 uses the channel estimate to generate the modified observation, whereas the LLR module 225 uses the channel estimate and the estimated or measured noise power to generate LLRs. A wireless receiver focussing on a single-antenna implementation is first described. A wireless receiver generalising to a multiple-antenna (i.e. spatially diversified) implementation is then described.

Channel-Matching an Observation

In the step 304, the observation modifier 222 is configured to generate a modified observation y. The observation modifier 222 computes the modified observation y based on a product of the received observation r and the complex conjugate of the complex-valued channel estimate h*. In one implementation, the modified observation y is given by:

$$y = rh^* \quad (9)$$

In another implementation, y is given by=crh*, that is, multiplied by an additional constant c compared to the implementation given in Equation (9). In the description that follows, the modified observation y is assume to be given by Equation (9).

As will become apparent below, the modified observation y is "channel-matched" since the log-likelihood ratios calculated based on the modified observation y have reduced dependence on the amplitude of the complex-valued channel h, compared to the equalised observation given by Equation (2). Stronger channels should generally be more assertive than weaker channels. The observation is brought into coherent alignment with the original transmitted symbol, where the rotational effects because of the channels are removed.

Generating Log Likelihood Ratios

In step 306, the modified (e.g. channel-matched) observation generated may be provided to the LLR module 225 for generating LLRs. The generated LLRs may be used for subsequent decoding by, for example, decoder 226. In one arrangement, the LLR module 225 computes the LLR for individual bits constituting the symbol d based on the modified observation y. Using the case of 16-QAM as an example, the probability P that the received observation r resulted from transmission with the i-th bit $b_i$ (where i∈0, 1, 2 and 3) defining the transmitted symbol d and being 1 is:

$$P(r|b_i=1) = \Sigma_{d \in D_i^1} P(r|d) \quad (10)$$

where $D_i^1$ is the set of all constellation points with bit i ($b_i$) equal to 1. Expanding and simplifying (10) provides:

$$P(r|b_i=1) = C \sum_{d \in D_i^1} \exp\left[\frac{\text{Re}(y^*d) - \frac{|h|^2|d|^2}{2}}{\sigma^2}\right] \quad (11)$$

where y=rh* is the matching of the observation to the channel. A similar expression to Equation (11) can be derived where the additional constant c is involved.

Decomposing the symbol constellation point d and the modified observation y into their in-phase (I) and quadrature (Q) components as $d=d_I+jd_Q$ and $y=y_I+jy_Q$, respectively, Equation (11) becomes:

$$P(r|b_i=1) = \\ C \sum_{d_I \in M_i^1} \exp\left[\frac{y_I d_I - \frac{|h|^2|d_I|^2}{2}}{\sigma^2}\right] \sum_{d_Q} \exp\left[\frac{y_q d_q - \frac{|h|^2|d_Q|^2}{2}}{\sigma^2}\right] \quad (12)$$

where the bit to constellation mapping according to (8a) and (8b) have been used. The set of real value $M_i^1$ are the values of each axis (assumed the same for I and Q components) where bit i ($b_i$) takes value 1. For example, in 16-QAM. $M_1^1 = M_3^1 = \{-1, +1\}$ and $M_0^1 = M_2^1 = \{+1, +3\}$. It is assumed here that the bit of interest affects the in-phase component. The sum over $d_Q$ is the sum over all possible values of the quadrature component. A similar expression to Equation (12) can be derived for the probability $P(r|b_i=0)$ that r resulted from transmission with the i-th bit $b_i$ (where i∈0, 1, 2 and 3) defining the transmitted symbol d and being 0.

The likelihood ratio, assuming that bit i affects only the in-phase components, is given by:

$$\frac{P(r|b_i=1)}{P(r|b_i=0)} = \frac{\sum_{d_I \in M_i^1} \exp\left[\left(y_I d_I - \frac{|h|^2|d_I|^2}{2}\right)/\sigma^2\right]}{\sum_{d_I \in M_i^0} \exp\left[\left(y_I d_I - \frac{|h|^2|d_I|^2}{2}\right)/\sigma^2\right]} \quad (13)$$

$b_0$ For the most significant bit (MSB) b0 of the 16-QAM constellation, which relates to the sign of the transmitted symbol, $M_0^1 = \{+1, +3\}$ and $M_0^0 = \{-1, -3\}$, which provides the likelihood ratio for bit b0 as:

$$\frac{P(r|b_0=1)}{P(r|b_0=0)} = \frac{\exp\left[\left(y_I - \frac{|h|^2}{2}\right)/\sigma^2\right] + \exp\left[\left(3y_I - \frac{9|h|^2}{2}\right)/\sigma^2\right]}{\exp\left[\left(-y_I - \frac{|h|^2}{2}\right)/\sigma^2\right] + \exp\left[\left(-3y_I - \frac{9|h|^2}{2}\right)/\sigma^2\right]} \quad (14)$$

where the first and second exponents in the numerator arise from the symbol constellations $d_I$ having real values M=+1 and M=+3, respectively, and the first and second exponents in the denominator arise from the symbol constellations $d_I$ having real values M=−1 and M=−3, respectively.

Taking the logarithmic of Equation (14), the log likelihood ratio $\lambda_0$ for b0 is given by:

$$\lambda_0 = \log \frac{P(r|b_0=1)}{P(r|b_0=0)} \quad (15)$$

Equation (15) can be simplified by approximation to quicken execution time of the demodulator 223. There are four exponents in Equation (14). Depending on the value of the modified observation y (in particular its 1-component $y_I$ or its Q-component $y_Q$), only the exponent having greater contribution to the probability function in each of the numerator and the denominator is retained, while the exponent having less contribution to the probability function in each of the numerator and the denominator is disregarded. In particular:

For "small-magnitude" modified observations, that is for $y_I \leq \pm 2$, $\lambda_0$ can be approximated by disregarding the contributions from the M=+3 and M=−3 symbol constellations (i.e. the second exponents in both the numerator and the denominator in (14)) and relying on the contributions from M=+1 and M=−1 (i.e. the second exponents in both the numerator and the denominator in (14)) to give:

$$\lambda_0 \approx \left[\frac{\left(y_I - \frac{|h|^2}{2}\right)}{\sigma^2}\right] - \left[\frac{\left(-y_I - \frac{|h|^2}{2}\right)}{\sigma^2}\right] = 2y_I/\sigma^2 \quad (16a)$$

For positive and "large-magnitude" modified observations, that is for $y_I > +2$, $\lambda_0$ can be approximated by disregarding the contributions from M=+1 and M=−3 (i.e. the second and the first exponents in the numerator and the denominator, respectively in (14)) and relying on the contributions from M=−1 and M=+3 (i.e. the first and the second exponents in the numerator and the denominator, respectively, in (14)) to give:

$$\lambda_0 \approx \left[\frac{\left(y_I - \frac{|h|^2}{2}\right)}{\sigma^2}\right] - \left[\frac{\left(-3y_I - \frac{9|h|^2}{2}\right)}{\sigma^2}\right] = \frac{4y_I}{\sigma^2} - \frac{4|h|^2}{\sigma^2} \quad (16b)$$

For negative and "large-magnitude" modified observations, that is for $y_I < -2$, $\lambda_0$ can be approximated by disregarding the contributions from M=−1 and M=+3 (i.e. the first and the second exponents in the numerator and the denominator, respectively, in (14)) and relying on the contributions from M=+1 and M=−3 (i.e. the second and the first exponents in the numerator and the denominator, respectively, in (14))) to give:

$$\lambda_0 \approx -\left[\frac{\left(-y_I - \frac{|h|^2}{2}\right)}{\sigma^2}\right] - \left[\frac{\left(-3y_I - \frac{9|h|^2}{2}\right)}{\sigma^2}\right] = \frac{4y_I}{\sigma^2} + \frac{4|h|^2}{\sigma^2} \quad (16c)$$

For completeness, for equal power modified observations, $\lambda_0 \approx 4y_I/\sigma^2$ by disregarding the contribution of M=+/−1 and relying on the contribution of M=+/−3.

Figure 7A:
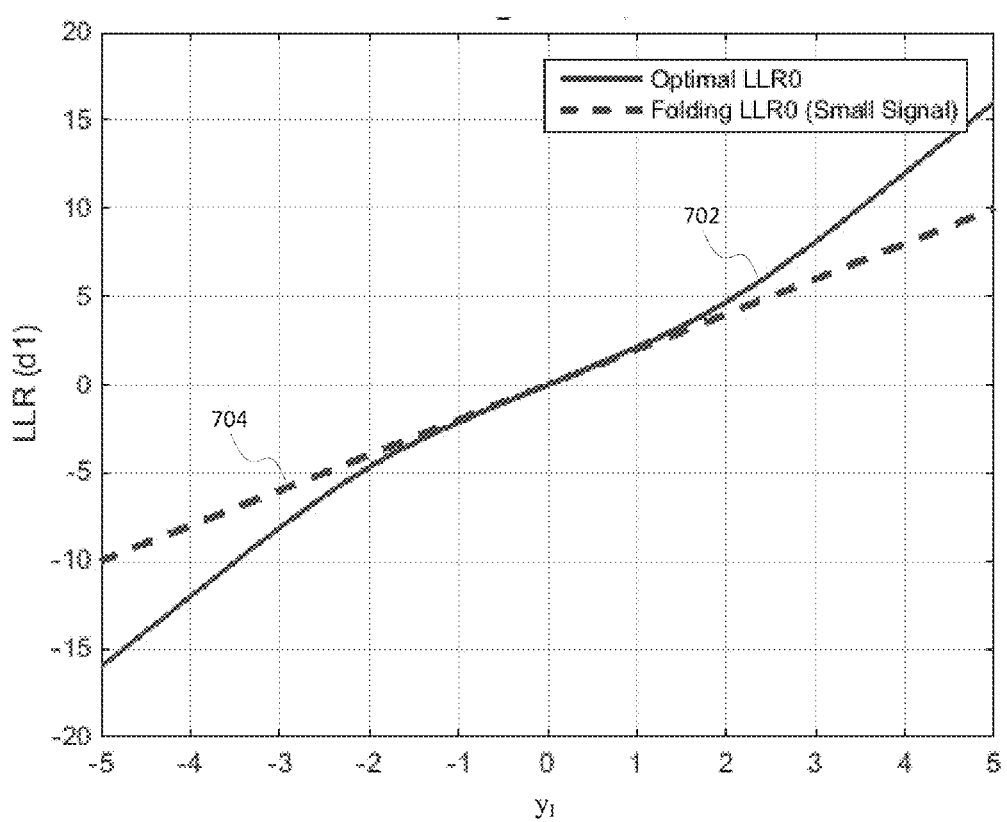
FIG. 7A plots a comparison between optimal LLR values and approximated LLR values for b0 for "small-magnitude" $y_I$.
Figure 7B:
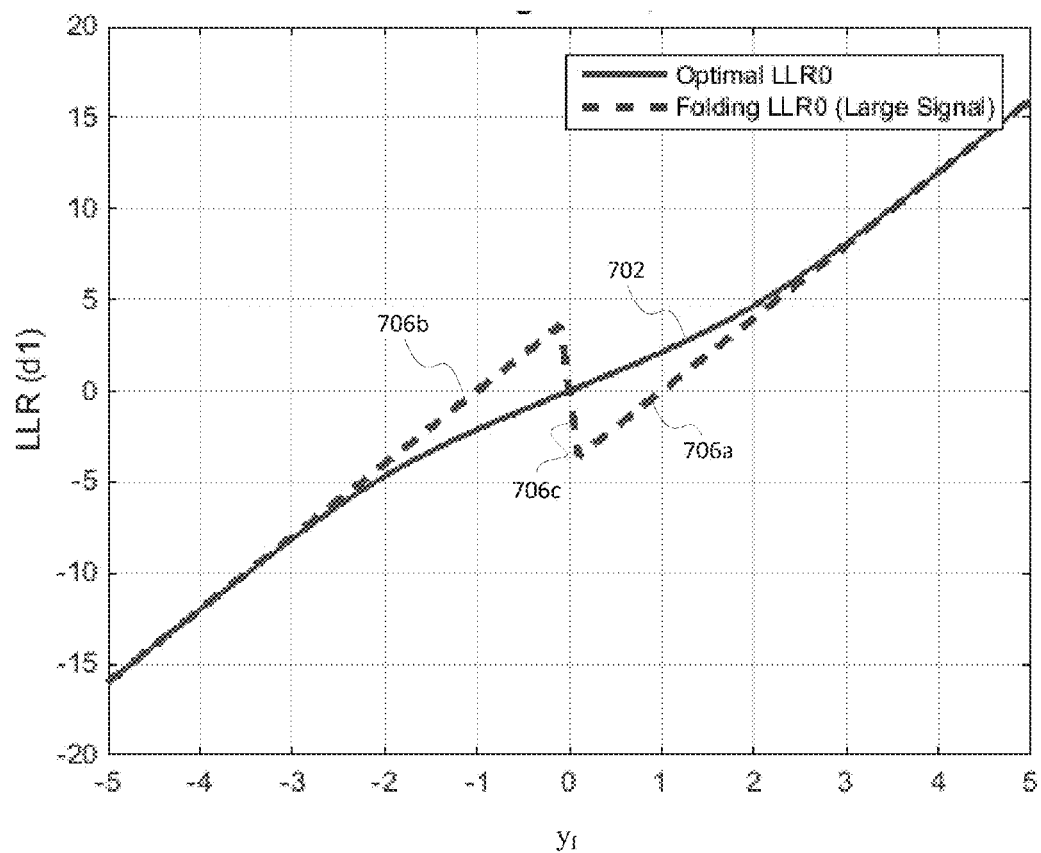
FIG. 7B plots a comparison between optimal LLR values and approximated LLR values for b0 for "large-magnitude" $y_I$.

FIGS. 7A and 7B provide a comparison between the optimal LLR (i.e. the LLR given by Equation (14)) and the approximations given by Equations (16a)-(16c). In FIG. 7A, the optimal LLR0 ($\lambda_0$) (reference numeral 702) is seen to be closely approximated by the approximated LLR0 ($\lambda_0$) given by Equation (16a) (reference numeral 704) at small magnitudes (i.e. $y_I \pm 2$). Similarly, in FIG. 7B, the optimal LLR0 ($\lambda_0$) (reference numeral 702) is seen to be also closely approximated by the approximated LLR0 ($\lambda_0$) given by Equations (16b) and (16c) (reference numerals 706a and 706b) at large magnitudes (i.e. $y_I > \pm 2$). (Note that the approximated LLR0 ($\lambda_0$) at $y_I = 0$ is $\pm 4|h|^2/\sigma^2$ and is thus discontinuous. In FIG. 7B, the small segment 706c joining the two segments 706a and 706b is an artefact resulting from the graphing tool)

A generated LLR greater than 0 (i.e. above the upper part of Figure) indicates that the bit $b_0$ in question is more likely to be a logical 1 than a logical 0 (and vice versa). The LLRs are provided to the decoder 226 for decoding purposes. The close agreement between the optimal and the approximated LLRs indicates, in some arrangements, that it may be beneficial to sacrifice obtaining the optimal values of LLR for the sake of faster execution of LLR computation according to Equations (16a) to (16c). For completeness, for $y_I$ equal to boundary values (e.g. $y_I = \pm 2$), since the small-magnitude and the large-magnitude approximations (for small |h|) intersect at $y_I = \pm 2$, as shown in FIG. 7A, either approximation is appropriate.

b1

For the next significant bit b1 of the 16-QAM constellation. $M_1^1 = \{-1, +1\}$ and $M_1^0 = \{-3, +3\}$, which provides the likelihood ratio for bit b1 as:

$$\frac{P(r|b_1=1)}{P(r|b_1=0)} = \exp\left[4\frac{|h|^2}{\sigma^2}\right] \frac{\exp[-y_I/\sigma^2] + \exp[y_I/\sigma^2]}{\exp[-3y_I/\sigma^2] + \exp[3y_I/\sigma^2]} \quad (17)$$

where the first and second exponents in the numerator arise from the symbol constellations $d_I$ having real values M=−1 and M=+1, respectively, and the first and second exponents in the denominator arise from the symbol constellations $d_I$ having real values M=−3 and M=+3, respectively.

Taking the logarithmic of Equation (17), the log likelihood ratio $\lambda_1$ for b1 is given by:

$$\lambda_1 = \log\frac{P(r|b_1=1)}{P(r|b_1=0)} \quad (18)$$

Like Equation (15), Equation (18) can be simplified by approximation in a similar manner to quicken execution time as follows:

For positive modified observations, that is for $y_I > 0$, $\lambda_1$ can be approximated by disregarding the contributions from the M=−1 and M=−3 symbol constellations (i.e. the first exponents in both the numerator and the denominator in (17)) and relying on the contributions from M=+1 and M=+3 (i.e. the second exponents in both the numerator and the denominator in (17)) to give:

$$\lambda_1 \approx \left[\frac{4|h|^2}{\sigma^2}\right] + [y_I/\sigma^2] - [3y_I/\sigma^2] = \left[\frac{4|h|^2}{\sigma^2}\right] - \frac{2y_I}{\sigma^2} \quad (19a)$$

For negative modified observations, that is for $y_I < 0$, $\lambda_1$ can be approximated by disregarding the contributions from M=+1 and M=+3 (i.e. the second exponents in both the numerator and the denominator in (17)) to give and relying on the contributions from M=−1 and M=−3 (i.e. the first exponents in both the numerator and the denominator in (17)):

$$\lambda_1 \approx \left[\frac{4|h|^2}{\sigma^2}\right] + [-y_I/\sigma^2] - [-3y_I/\sigma^2] = \left[\frac{4|h|^2}{\sigma^2}\right] + \frac{2y_I}{\sigma^2} \quad (19b)$$

Combining Equations (19a) and (19b), the LLR for b1 can be approximated and expressed as:

$$\lambda_1 \approx \left[\frac{4|h|^2}{\sigma^2}\right] - \left|\frac{2y_I}{\sigma^2}\right| \quad (19c)$$

$\lambda_1(y_I=0) = \lambda_0^{large\text{-}magnitude}(y_I=0) = 4|h|^2/\sigma^2 = 4\eta$ is termed the "fold point" of the demodulator 223, which is called a folding demodulator. That is, the fold point takes the value of the LLR of the next significant bit $\lambda_1$ (or the negative of the most significant bit in large-magnitude approximation $-\lambda_0^{large\text{-}magnitude}$) when the in-phase component or quadrature component (depending on which of complementary LLRs is in question) of the modified observation is zero. The fold point may assist in identifying the LLR for the next significant bit. $\eta = |h|^2/\sigma^2$ is the channel power to noise power ratio, or the signal-to-noise ratio (SNR). The noise power, represented by $\sigma^2$, may be estimated or measured by the noise power estimator 240.

Figure 7C:
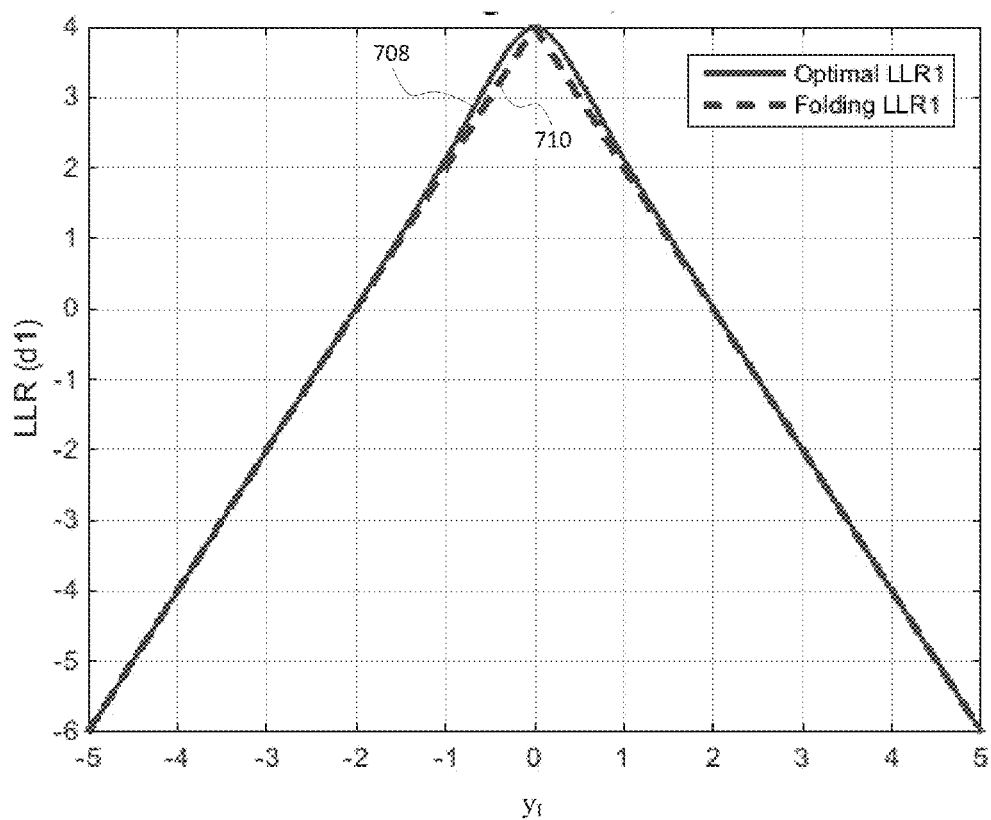
FIG. 7C plots a comparison between optimal LLR values and approximated LLR values for b1.

FIG. 7C provides a comparison between the optimal LLR (i.e. Equation (17)) and the approximations given by Equations (19a)-(19c). The optimal LLR1 ($\lambda_1$) (reference numeral 708) is seen to be closely approximated by the approximated LLR1 ($\lambda_1$) given by Equation (19c) (reference numeral 710) regardless of magnitudes of $y_I$.

A LLR greater than 0 (i.e. the upper part of FIG. 7C) indicates that the corresponding bit $b_1$ is more likely to be a logical 1 than a logical 0 (and vice versa). The LLRs are provided to the decoder 226 for decoding purposes. The close agreement indicates, in some arrangements, that it may be beneficial to sacrifice obtaining the optimal values of LLR for faster execution of LLR computation according to Equations (19a) to (19c).

Figure 7D:
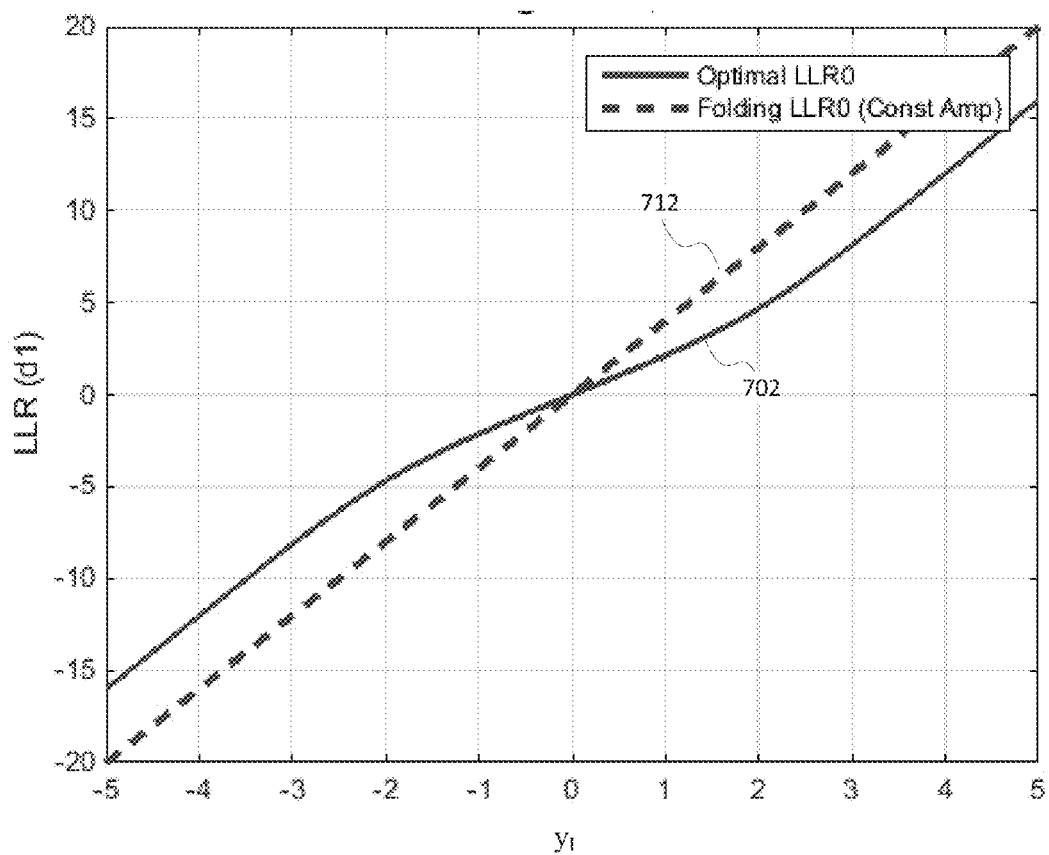
FIG. 7D plots a comparison between optimal LLR values and folding LLR values for b0.
Figure 7E:
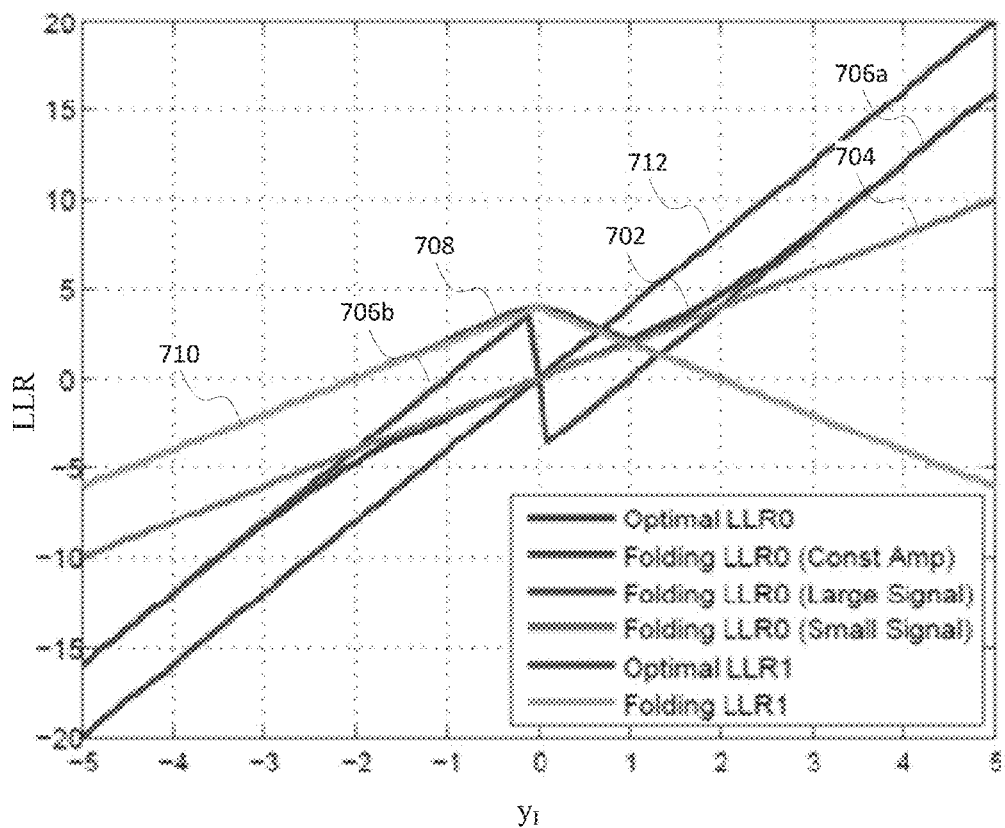
FIG. 7E plots the comparison shown in FIGS. 7A, 7B, 7C and 7D together.

For completeness, FIG. 7D provides a comparison between the optimal LLR0 ($\lambda_0$) (reference numeral 702) and the folding LLR0 (i.e. equal power modified observation) $\lambda_0 = 4y_I/\sigma^2$ (reference numeral 712). For illustration purposes, FIG. 7E provides all LLR0 shown in FIGS. 7A-7D on the same scale. In all of FIGS. 7A-7E, the signal-to-noise ratio is 0 dB, such that $\eta = |h|^2/\sigma^2 = 1$.

b2 and b3

Similarly, a skilled person in the art would appreciate that, the expressions $\lambda_2$ and $\lambda_3$ for the LLRs for bit b2 and b3 are similar to those of $\lambda_0$ and $\lambda_1$, respectively, except that $y_I$ is replaced by $y_Q$. $\lambda_2$ and $\lambda_0$ are complementary LLRs, and are the most significant bits. Similarly, $\lambda_3$ and $\lambda_1$ are also complementary LLRs, and are the next significant bits (and also the least significant bits in the case of 16-QAM)).

Figure 6B:
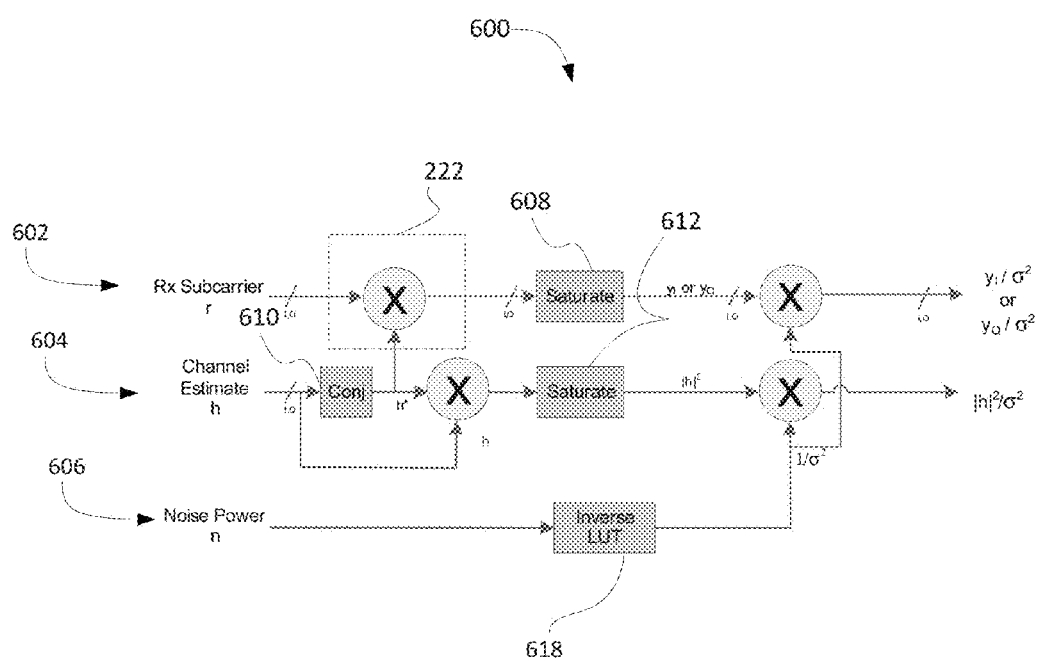
FIG. 6B illustrates a logic block diagram of an example of a subsystem 600 in accordance with one embodiment.
Figure 6C:
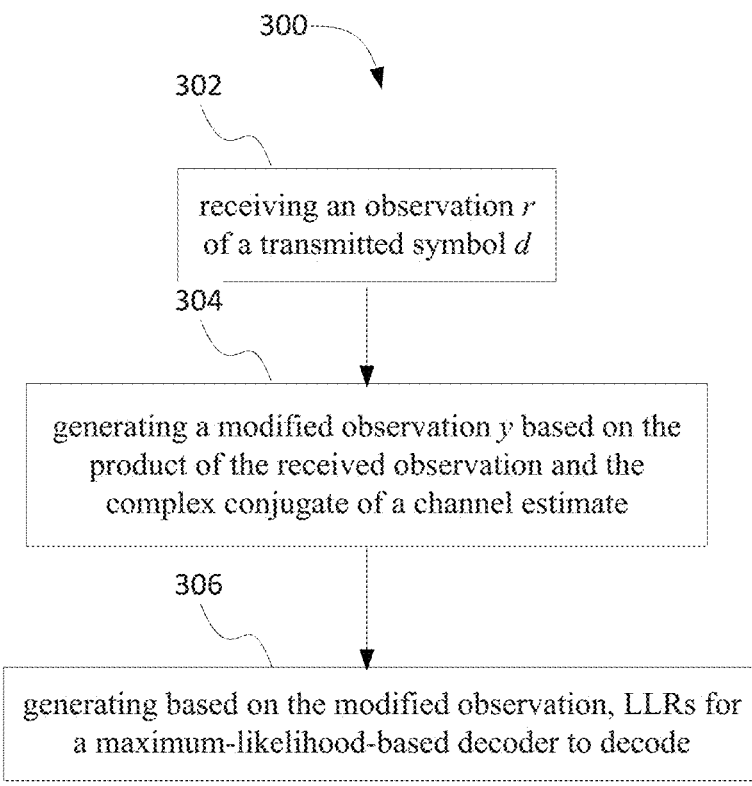
FIG. 6C illustrates a method of demodulation in accordance with one embodiment.
Figure 6D:
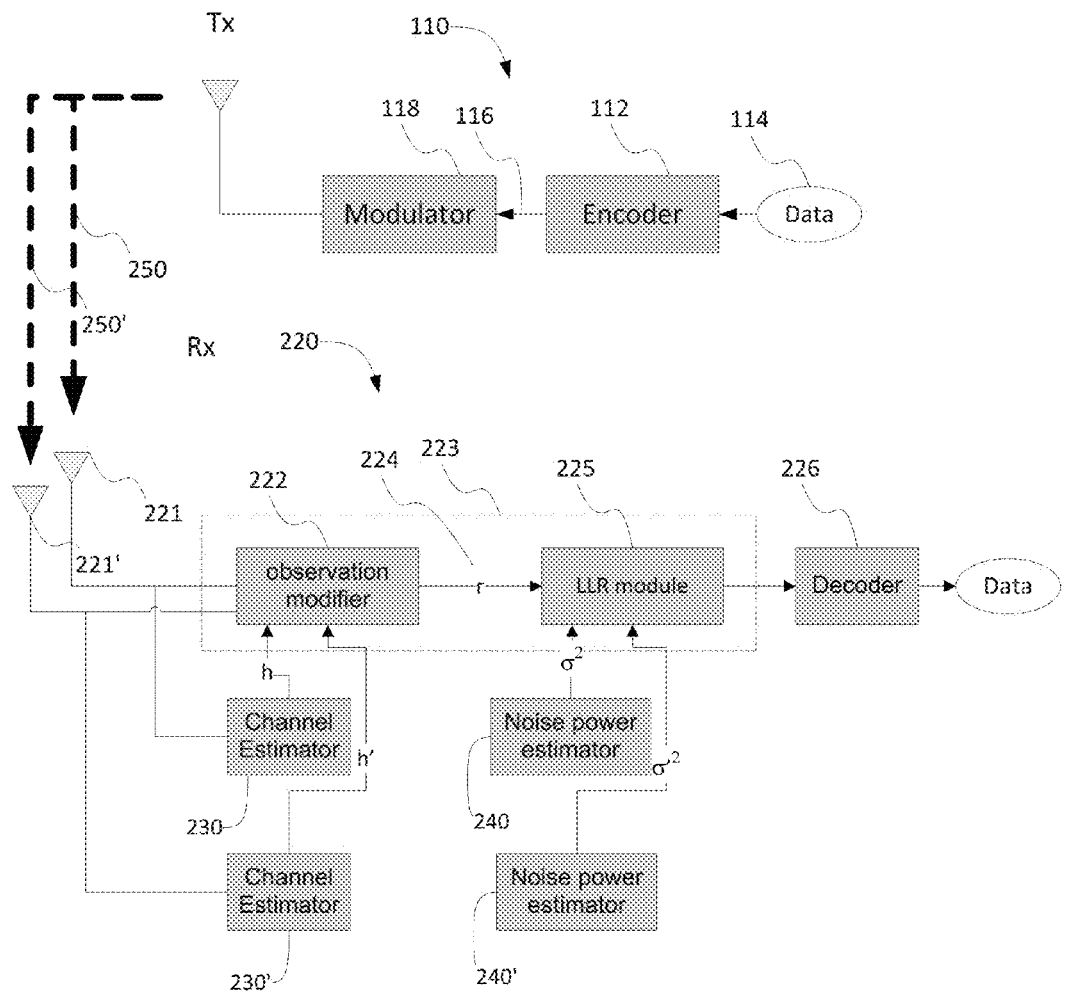
FIG. 6D illustrates a wireless transmitter and of a wireless receiver coupled by a communication channel in accordance with another embodiment.

FIG. 6B illustrates a logic block diagram of a subsystem 600 including an observation modifier 222 and related components in facilitating calculation of Equations (16a)-(16c) and Equations (19a)-(19c). In the first branch 602, the observation modifier 222 obtains a received observation r. The observation modifier 222 multiplies the received observation r by the conjugate of the channel estimate h obtained from the second branch 604 from, for example, a channel estimator (not shown) to generate a modified observation y. Either the I or Q component of y, depending on which of the complementary LLRs is to be calculated, is saturated by a saturate block 608. In the second branch 604, the channel estimate is conjugated by a conjugate block 610 and provided to the first branch 602 for the multiplication operation described above. Still in the second branch 604, the channel estimate is multiplied by its conjugate before being saturated by a saturate block 612 to provide the channel power (represented by $|h|^2$). In the third branch 606, a measured or estimated noise power (represented by $\sigma^2$) is obtained, for example from a noise power estimator, and is inverted by an inverse block 618. The inverse block 618 may be a look up table (LUT). The inverted noise power ($1/\sigma^2$) is provided to the second branch 604 for multiplying with the channel power to estimate the signal-to-noise ratio (represented by $|h|^2/\sigma^2$). The inverted noise power ($1/\sigma^2$) is provided to the first branch 602 to calculate $y_I/\sigma^2$ or $y_Q/\sigma^2$. The outputs of the first branch 602 (i.e. $y_I/\sigma^2$ or $y_Q/\sigma^2$) and the second branch (i.e. $|h|^2/\sigma^2$) facilitate the calculation of LLR approximations given by Equations (16a)-(16c) and also (19a)-(19c).

From the foregoing, it is apparent that the LLRs generated based on the modified observation v has reduced dependence on the magnitude of the channel h.

64 QAM

The foregoing examples are directed to a 16-QAM system. It should be apparent to a skilled person to derive, for a 64-QAM systems, similar expressions for $\lambda_0, \lambda_1, \lambda_2, \lambda_3, \lambda_4, \lambda_5$.

Further Simplification

Figure 8:
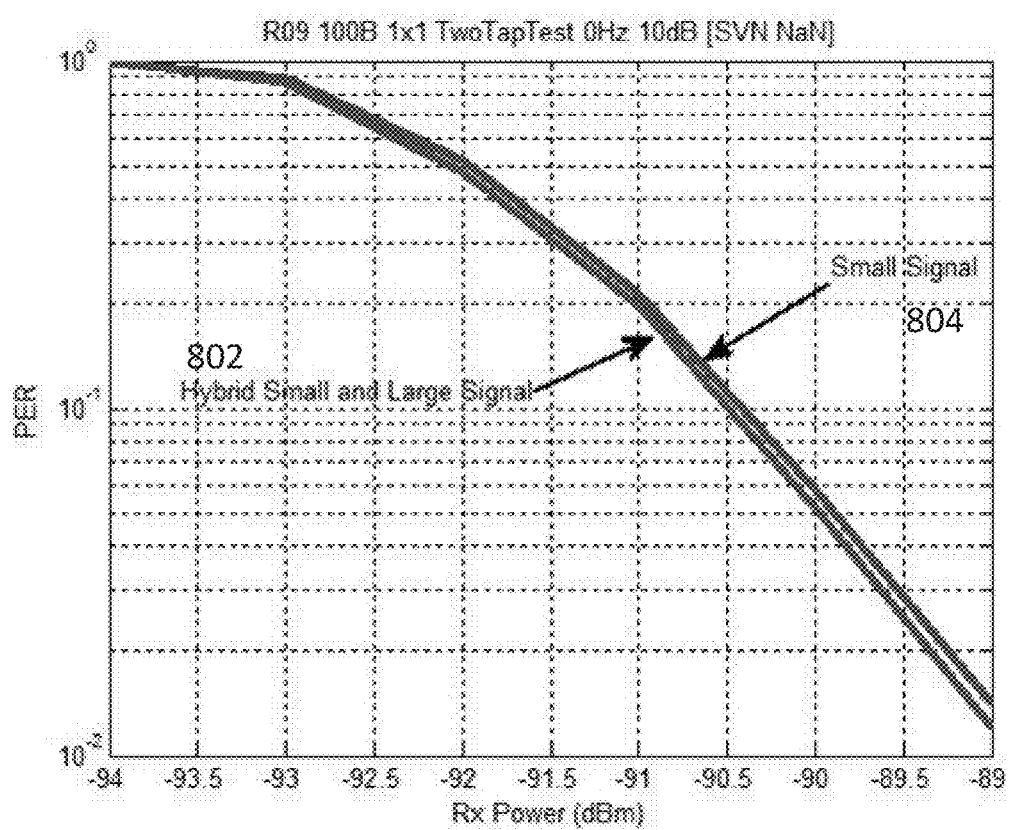
FIG. 8 plots a comparison of the packet error rate between using small-magnitude approximation only and using both small and large-magnitude approximations to LLR.

Equation (19c) indicates that $\lambda_1$ (and hence $\lambda_3$) is given by one approximation. On the other hand, Equations (16a)-(16c) indicate that $\lambda_0$ (and hence $\lambda_2$) can be given by three different approximations, depending on the magnitude of the real part (and the imaginary part) of the modified observation y. It would further simplify the demodulator 223 where $\lambda_0$ (and hence $\lambda_2$) is approximated by only one of the approximations. FIG. 8 illustrates a comparison between the packet error rate (PER) 802 where $\lambda_0$ (and hence $\lambda_2$) is approximated by all 3 approximations depending on the magnitude of the real part (or the imaginary part) of the modified observation, and the PER 804 where $\lambda_0$ (and hence $\lambda_2$) is approximated by Equation (16a), that is, the small-magnitude approximation, regardless of on the magnitude of the real part (or the imaginary part) of the modified observation y. $\lambda_1$ and $\lambda_3$ are approximated by Equation (19c). As illustrated in FIG. 8, there is only a small degradation in PER where only the small-magnitude approximation of $\lambda_0$ and $\lambda_2$ is used. For example, at receiver power of −89 dBm, the difference is between about 0.014 (for PER 802) and 0.015 (for PER 804).

Spatial Diversity

For spatially diversified receivers having multiple antennas, such as a first antenna 221 and a second antenna 221', each antenna generally perceives a different channel h and is associated with a different antenna noise power n. The equations above may be extended with modifications as follows and the demodulation may be adapted accordingly. For the a-th antenna, the received observation r of symbol d becomes:

$$r[i,j,a] = h[i,j,a]d[i,j] + n[i,j,a] \quad (20)$$

using like designations of h, d, i and j as Equation (1).

The modified observation ρ for calculating an effective LLR across all antennas can be given by a weighted sum of individual modified observation y for each antenna a in the form of Equation (9). In particular, the weights are given by the antenna noise power represented by $\sigma_a^2$:

$$\rho[i,j] = \Sigma_a y[i,j,a]/\sigma_a^2 = \Sigma_a h^*[i,j,a]r[i,j,a]/\sigma_a^2 \quad (21)$$

In other words, in a spatially diversified receiver, the observation modifier 222 may generate an effective modified observation ρ as a weighted sum, based on the product of the observation received by individual antennas and the complex conjugate of the channel estimate of the channel perceived by the respective antenna, normalised by the respective antenna noise power.

The noise power estimator may be configured to estimate or measure the effective SNR calculated as the sum of SNRs of individual antennas:

$$\eta[i,j] = \Sigma_a h^*[i,j,a] h[i,j,a]/\sigma_a^2 = \Sigma_a |h[i,j,a]|^2/\sigma_a^2 \qquad (22)$$

For a 16-QAM system, the LLR module 225 may be configured to calculate the complementary LLRs for the most significant bits (i.e. $\lambda_0$ and $\lambda_2$) as:

$$\lambda_0[i,j] \approx 2\rho_I[i,j] \qquad (23a)$$

$$\lambda_2[i,j] \approx 2\rho_Q[i,j] \qquad (23b)$$

where $\rho_I$ and $\rho_Q$ are the real and imaginary parts of the modified observation ρ. It is noted that Equation (23a) (and hence similarly (23b)) takes the same form as Equation (16a) except that the effective modified observation is based the noise-weighted sum given by Equation (21), rather than Equation (9). Further, the LLR module 225 may be configured to calculate the complementary LLRs for the least significant bits (i.e. $\lambda_1$ and $\lambda_3$) as:

$$\lambda_1[i,j] \approx 4\eta[i,j] - |\lambda_0[i,j]| \qquad (23c)$$

$$\lambda_3[i,j] \approx 4\pi[i,j] - |\lambda_2[i,j]| \qquad (23d)$$

It is noted that Equation (23a) (and hence similarly (23b)) takes the same form as Equation (19a) except that the effective modified observation is based on the weighted sum given by Equation (21), rather than Equation (9), and also that the SNR η is the sum of channel power to noise power ratio, summed over all antennas.

Figure 9:
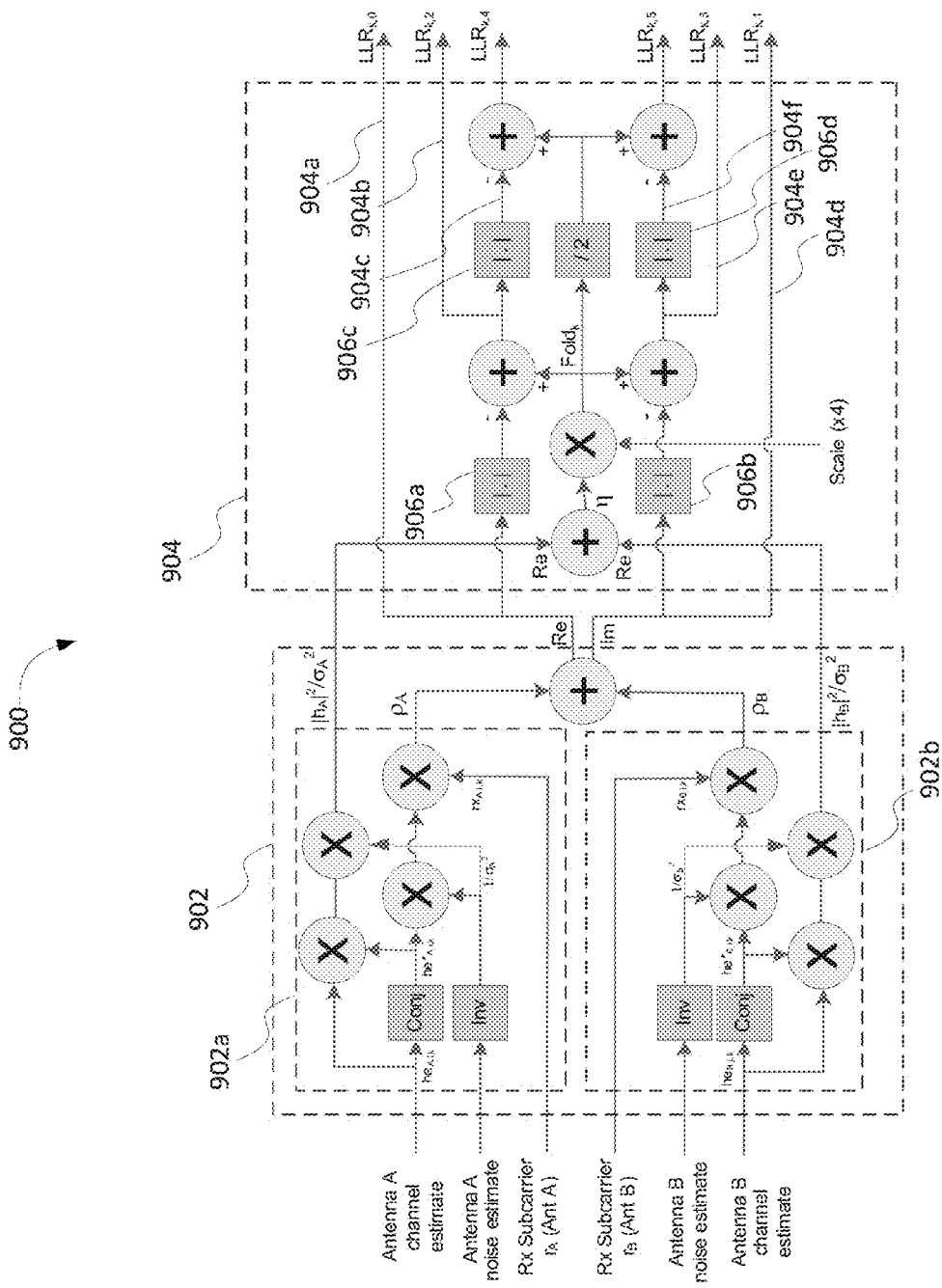
FIG. 9 illustrates a logic block diagram of an example of a demodulator in accordance with one embodiment.

For a 64-QAM system, it should be apparent to a skilled person that the LLR module 225 may be configured to calculate the complementary LLRs for the most significant bits (MSB), the next significant bits (NSB) and the least significant bits (LSB) following a similar and slightly modified procedure above for 16-QAM:

For MSB: $\lambda_0[i,j] \approx 2\rho_I[i,j] \qquad (24a)$ $\lambda_3[i,j] \approx 2\rho_Q[i,j] \qquad (24b)$ For NSB: $\lambda_1[i,j] \approx 4\eta[i,j] - |\lambda_0[i,j]| \qquad (24c)$ $\lambda_4[i,j] \approx 4\eta[i,j] - |\lambda_3[i,j]| \qquad (24d)$ For LSB: $\lambda_2[i,j] \approx 2\eta[i,j] - |\lambda_1[i,j]| \qquad (24e)$ $\lambda_5[i,j] \approx 2\eta[i,j] - |\lambda_4[i,j]| \qquad (24f)$ Again, Equations (24a) to (24d) have the same form as Equations (23a) to (23d). Equations (24e) and (24f) follow similar approximations. FIG. 9 illustrates a logic block diagram for an example of a demodulator 900 including an observation modifier 902 and a LLR module 904 for a multiple-antenna implementation in a 64-QAM system. The observation modifier 902 is configured to generate a modified observation according to Equation (21). The LLR module 904 is configured to generate LLRs according to Equations (22)-(24).

The observation modifier 902 includes a first subsystem 902a for a first antenna A and a second subsystem 902b for a second antenna B. Each of the subsystems 902a and 902b is similar to the subsystem 600 FIG. 6B (without showing the saturate blocks, the inverse LUT block, the shift block or Calc exponent block for simplification), except that their outputs $\rho_A$ and $\rho_B$ are noise-weighted modified observations. In other words, $\rho_A$ and $\rho_B$ are individual terms for the respective antennas in the summation given by Equation (21). The observation modifier 902 computes the summation and provides an effective modified observation ρ as an output. The first subsystem 902a and the second subsystem 902b, like the subsystem 600, also provides estimates of the signal-to-noise ratio for each antenna (represented by $|h_A|^2/\sigma_A^2$ and $|h_B|^2/\sigma^2$).

As shown in FIG. 9, the LLR module 904 obtains and add $|h_A|^2/\sigma_A^2$ and $|h_B|^2/\sigma_B^2$ to generate η according to Equation (22). The LLR module 904 also obtains the real and imaginary parts of the effective modified observation ρ. According to Equations 24(a)-(e), the LLR module 904 calculates LLR0, LLR2 and LLR4 (i.e. LLRs for the MSB, NSB and LSB) based on the real part and calculates LLR1, LLR3 and LLR5 (i.e. LLRs for the MSB, NSB and LSB) based on the imaginary part:

In the first and the fourth branches 904a and 904d, the LLR0 and LLR1 are calculated based on Equations (24a) and (24b). For simplification, a multiplication block by a factor of 2 (according to Equations 24(a) and (b)) is not shown for LLR0 and LLR. LLR0 and LLR1 therefore is shown to take the real and imaginary parts, respectively, of the effective modified observation ρ directly.

In the second and the fifth branches 904b and 904e, the LLR2 and LLR3 are calculated based on Equations (24c) and (24d). For simplification, a multiplication block by a factor of 2 (according to Equations 24(a) and (b)) to calculate LLR0 and LLR1 is not shown. LLR2 and LLR3 are obtained by providing LLR0 and LLR1 to an absolute value block (906a and 906b) and adding to a scaled η generated by the LLR module 904. The scale is 4 according to Equations (24c) and (24d).

In the third and the sixth branches 904c and 904f, the LLR4 and LLR5 are calculated based on Equations (24e) and (24f). LLR4 and LLR5 are obtained by providing LLR2 and LLR3 to an absolute value block (906c and 906d) and adding to a scaled η generated by the LLR module 904. The scale is 2 according to Equations (24e) and (24f).

One or more of the components of the receiver 220 or the demodulator 900 may be implemented as software, such as a computer program including instructions stored in a non-transitory computer-readable medium and executable by the one or more processors. In one example, the non-transitory computer-readable medium is a memory or storage module, such as volatile memory including a random access memory (RAM), non-volatile memory including read-only memory (ROM), or a harddisk. The one or more processors may be one or more computer processing units (CPUs). Alternatively or additionally the one or more of the components of the receiver 220 may be implemented as hardware, such as using one or more digital signal processors (DSPs), application-specific integrated circuits (ASICs) or field-programmable gate arrays (FPGAs).

What is claimed is:

1. A method comprising:
   receiving, at a first antenna, an observation of a symbol transmitted across a wireless communications channel perceived by the first antenna;
   generating a modified observation of the symbol based on a product of the received observation and the complex conjugate of a channel estimate of the channel; and generating, based on the modified observation and the channel estimate, log-likelihood ratios (LLRs) for the symbol for a maximum-likelihood-based decoder to decode, wherein generating log-likelihood ratios includes:
generating a LLR associated with a most significant bit of the symbol, and
generating a LLR associated with a next most significant bit of the symbol;
wherein the log-likelihood ratio (LLR) associated with the most significant bit is generated based on the ratio of the real part ($y_I$) or imaginary part ($y_Q$) of the modified observation to Gaussian-distributed noise power of the channel.

2. The method of claim 1 wherein the LLR associated with the most significant bit is estimated to be $2y_I/\sigma^2$ or $2y_Q/\sigma^2$, where $\sigma^2$ represents the Gaussian-distributed noise power of the channel.

3. The method of claim 1 wherein the LLR associated with the most significant bit is estimated to be $4y_I/\sigma^2$ or $4y_Q/\sigma^2$, where $\sigma^2$ represents the Gaussian-distributed noise power of the channel.

4. The method of claim 1 wherein the LLR associated with the most significant bit is estimated to be $4y_I/\sigma^2 - 4|h|^2/\sigma^2$ or $4y_Q/\sigma^2 - 4|h|^2/\sigma^2$, where $\sigma^2$ represents the Gaussian-distributed noise power of the channel and $|h|$ represents the magnitude of the channel estimate.

5. The method of claim 1 wherein the LLR associated with the most significant bit is $4y_I/\sigma^2 + 4|h|^2/\sigma^2$, where $\sigma^2$ represents the variance of the Gaussian-distributed noise power of the channel and $|h|$ represents the magnitude of the channel estimate.

6. The method of claim 1 wherein the LLR associated with the next most significant bit is generated based on the ratio of the real part ($y_I$) or imaginary part ($y_Q$) of the modified observation to Gaussian-distributed noise power of the channel.

7. The method of claim 6 wherein the LLR associated with the most significant bit is $4|h|/\sigma^2 - 2y_I/\sigma^2$ or $4|h|/\sigma^2 - 2y_Q/\sigma^2$, where $\sigma^2$ represents the variance of the Gaussian-distributed noise power of the channel and $|h|$ represents the magnitude of the channel estimate.

8. The method of claim 1 wherein the Gaussian-distributed noise power is estimated or measured.

9. The method of claim 1 further comprising receiving, at a second antenna located separately from the first antenna, another observation of the symbol transmitted across a wireless communications channel perceived by the second antenna, and wherein generating a modified observation includes generating the modified observation also based on a product of the other received observation and the complex conjugate of a channel estimate of the channel perceived by the second antenna.

10. The method of claim 9 wherein generating the modified observation is based on a weighted sum of (a) the product of the received observation and the complex conjugate of a channel estimate of the channel and (b) the product of the other received observation and the complex conjugate of a channel estimate of the channel perceived by the second antenna.

11. The method of claim 10 wherein the weighted sum is based on weights associated with the noise power as observed by the respective antennas.

12. The method of claim 1 further comprising decoding, by a maximum-likelihood-based decoder, the LLRs.

13. A wireless receiver comprising:
a first antenna for receiving an observation including a symbol transmitted across a wireless communications channel perceived by the first antenna;
an observation modifier for generating a modified observation of the symbol based on a product of the received observation and the complex conjugate of a channel estimate of the channel;
a log-likelihood ratio (LLR) for the symbol module generating log-likelihood ratios (LLRs) based on the modified observation,
wherein generating log-likelihood ratios includes:
generating a LLR associated with a most significant bit of the symbol, and
generating a LLR associated with a next most significant bit of the symbol;
wherein the log-likelihood ratio (LLR) associated with the most significant bit is generated based on the ratio of the real part ($y_I$) or imaginary part ($y_Q$) of the modified observation to Gaussian-distributed noise power of the channel; and
a maximum-likelihood-based decoder for decoding the symbol based on the LLRs.

14. The wireless receiver of claim 13 further comprising a second antenna for receiving another observation of the symbol transmitted across a wireless communications channel by the second antenna, the first antenna and the second antenna are located to provide spatial diversity,
wherein the observation modifier is configured to generate the modified observation based on weighted sum of (a) the product of the received observation and the complex conjugate of a channel estimate of the channel and (b) the product of the other received observation and the complex conjugate of a channel estimate of the channel perceived by the second antenna.

15. The wireless receiver of claim 14 wherein the weighted sum is based on weights associated with the noise power as observed by the respective antennas.

16. A non-transitory machine-readable medium comprising instructions executable by one or more processors, the instructions including the steps of:
receiving, at a first antenna, an observation of a symbol transmitted across a wireless communications channel perceived by the first antenna;
generating a modified observation of the symbol based on a product of the received observation and the complex conjugate of a channel estimate of the channel; and
generating, based on the modified observation and the channel estimate, log-likelihood ratios (LLRs) for the symbol for a maximum-likelihood-based decoder to decode,
wherein generating log-likelihood ratios includes:
generating a LLR associated with a most significant bit of the symbol, and
generating a LLR associated with a next most significant bit of the symbol;
wherein the log-likelihood ratio (LLR) associated with the most significant bit is generated based on the ratio of the real part ($y_I$) or imaginary part ($y_Q$) of the modified observation to Gaussian-distributed noise power of the channel.

* * * * *